Aug. 28, 1962   H. D. CRANDON   3,051,054
LIGHT POLARIZING ARTICLES AND METHOD OF MAKING SAME
Filed Dec. 18, 1958

INVENTOR
HARRY D. CRANDON
BY
Louis L. Gagnon
ATTORNEY

United States Patent Office 3,051,054
Patented Aug. 28, 1962

3,051,054
LIGHT POLARIZING ARTICLES AND METHOD OF MAKING SAME
Harry D. Crandon, Woodstock, Conn., assignor to American Optical Company, Southbridge, Mass., a voluntary association of Massachusetts
Filed Dec. 18, 1958, Ser. No. 781,302
3 Claims. (Cl. 88—65)

This invention relates to light polarizers and has particular reference to the provision of a novel light-polarizing lens or similar article and method of making the same.

The principal object of the invention is to provide a novel and inexpensive light-polarizing lens or similar article and method of making the same comprising a single layer of clear transparent material having a single film of light-polarizing material tenaciously and uniformly bonded to a side surface thereof.

Another object is to provide a light-polarizing glass lens or similar article of the above nature wherein the light-polarizing layer comprises a polymer film of the type that contains free hydroxyl groups which has been rendered light polarizing and which has been treated with a silicic acid solution to render said film tenaciously bondable with the glass.

Another object is to provide a light-polarizing lens or similar article of the above nature wherein the surface to which the layer of light-polarizing material is secured is curved and the light-polarizing film is also curved and uniformly and tenaciously bonded with said surface.

Another object is to provide a method of forming a relatively inexpensive light polarizer comprising a single layer of glass having a film of light-polarizing polyvinyl alcohol or polyvinyl butyral uniformly and tenaciously bonded to a side surface thereof.

Another object is to provide a novel method of forming a light polarizer of the above character comprising the steps of subjecting a film of polyvinyl alcohol or polyvinyl butyral to a solution of from approximately 5% to 20% of a film-softening solution of sodium sulphate, sodium chloride, calcium chloride, sodium nitrate or other salt solutions in water at room temperature for a time interval sufficient to soften and render said film stretchable, stretching said film by an amount sufficient to orient its molecules, rinsing said sheet with water to remove excess solution, immersing said stretched film in a solution of silicic acid in water and alcohol wherein the silicic acid may be varied from approximately 6% to 40%, removing said film from said silicic acid solution and removing the excess of said solution, placing said film in superimposed relation with a side surface of a glass lens or similar article having a meniscus shape, causing said film to uniformly and intimately assume the shape of said surface in the presence of heat of approximately 150° F., subjecting said assembled film and glass lens or similar article to heat of approximately 175° F. for a period of time sufficient to cause said film to uniformly and tenaciously bond with the glass and to simultaneously render said film more stable and resistant to scratching and, at one stage in the method, dyeing said film by the application thereto of a suitable dye or stain to render the said film light polarizing.

Other objects and advantages of the invention will become apparent from the following description taken in connection with the accompanying drawings wherein.

Figure 1:
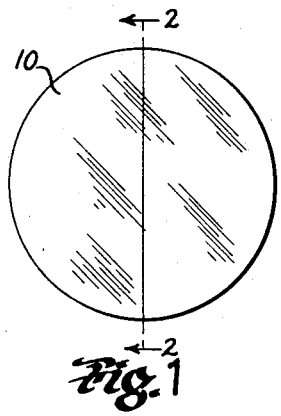
FIG. 1 is a face view of a lens or similar article embodying the invention.
Figure 2:
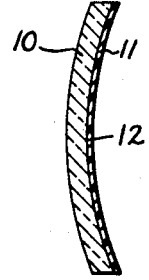
FIG. 2 is a sectional view taken as on line 2—2 of FIG. 1 and looking in the direction indicated by the arrows.

The invention, as has been previously set forth, is directed particularly to providing a glass lens or similar article with a film of light-polarizing material on one side surface thereof, which film is uniformly and tenaciously bonded with said glass surface and is further rendered stable and resistant to scratching.

In carrying out the invention, certain of the steps of the method are known and, further, certain of the solutions which will hereinafter be more specifically set forth are known in the art.

It is pointed out, however, that said solutions and methods in no way taught or attained the end result and method desired by applicant. Applicant is making mention of this fact with a view to more clearly defining the invention. For example, the technique of stretching a film of polyvinyl alcohol or the like to orient its molecules and the solutions employed in dyeing the stretched film to render it light polarizing are known and have been previously employed in forming light-polarizing films. The essence of the present invention, however, relates to the use of silicic acid which is water or alcohol-soluble, and which will condense with the hydroxyl groups of polyvinyl alcohol, polyvinyl butyral, or surface hydrolyzed cellulose acetate or the like and more particularly which will tenaciously bond said film to glass and, further, which will render said film more stable to retraction and resistant to scratching.

In carrying out the invention, the lens or article 10 to be provided with a light-polarizing film 11 of the above character is first ground and polished through the use of conventional glass abrading and polishing equipment to produce a surface 12 of the desired shape and texture.

The film 11, in its initial unstretched state, is first placed in a suitable container 14 preferably formed of glass having a suitable dye solution therein which may comprise approximately 45 grams of potassium iodide and approximately 5 grams iodine per 100 grams water at room temperature. The film 11 is allowed to remain in said solution for a time interval sufficient to produce the desired dyeing or staining effect. A time interval of approximately 30 seconds with the above solution has been found to produce desirable results.

It is to be understood, however, that sodium iodide or ammonium iodide or the like may be substituted for potassium iodide in similar related proportions and that the use of these materials is only to keep a sufficient concentration of iodine in the solution to prevent its being depleted by absorption in the film. Iodine vapor itself may be used for the purpose of staining the film. It is also to be understood that the amounts set forth above are only by way of illustration and may be varied as desired and with suitable variations in the above time interval as required and as commonly known in the art.

It is further to be understood that instead of iodine, other stains may be used as commonly known in the art, and that hydrochloric acid vapor and hydriotic acid vapor may be used. Certain dichroic dyes may also be used.

Figure 4:
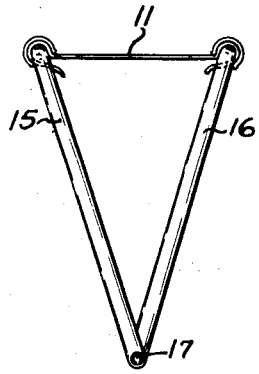
FIG. 4 is an end view of further apparatus employed in carrying out the invention and illustrating another step of the method of said invention.
Figure 5:
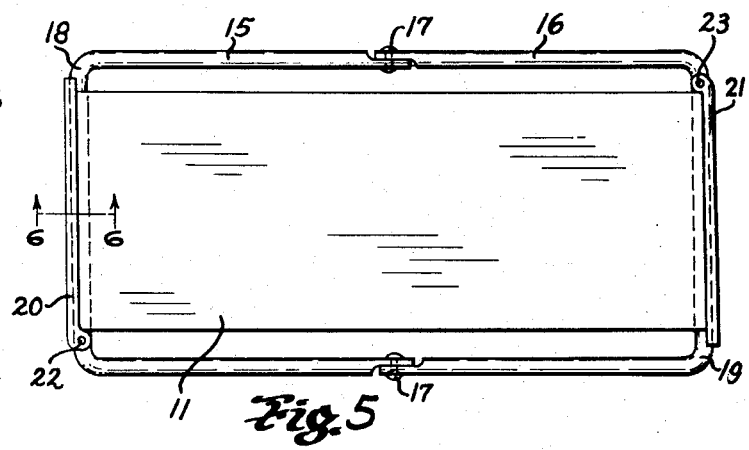
FIG. 5 is a plan view of the device of FIG. 4 illustrating another step in the method of the invention.
Figure 6:
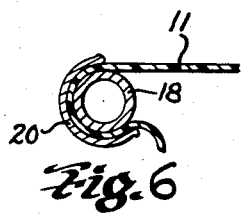
FIG. 6 is an enlarged fragmentary sectional view taken as on line 6—6 of FIG. 5 and looking in the direction indicated by the arrows.

The dyed film is then put in a solution of sodium sulphate or other suitable salt of from approximately 5% to 20% (preferably 10%) in water at room temperature for approximately 2½ to 3 minutes or for a time interval sufficient to soften the sheet to a point wherein it may be readily stretched while retaining the iodine stain or other dye in the film 11. The softened film 11 is then placed in a suitable stretching frame comprising two substantially U-shaped sections 15 and 16 which are hinged together by suitable pivot means 17 whereby said sections may be moved to open or closed relation with each other, as shown diagrammatically in FIGS. 4 and 5. The opposed ends of the film 11, as shown diagrammatically in FIG. 6 are wrapped around the bases 18 and 19 of the U-shaped sections and are held in said wrapped-around relation by suitable clamp members 20 and 21. The said clamp members may be formed separate of the frame or may be pivotally attached thereto, as illustrated at 22 and 23, and are so shaped as to inherently resiliently snap into clamped relation with the said bases 18 and 19 and the wrapped-around portions of the film 11 to firmly grip and hold said wrapped-around portions. The frame sections 15 and 16, at the time of clamping the softened film 11 to the base portions 18 and 19, are in partially closed relation with each other, as shown best in FIG. 4. After the film 11 has been properly attached to the stretching frame, the said portions 15 and 16 are moved outwardly of each other about the pivot 17 an amount sufficient to introduce the required stretch to the film 11 depending upon the extent of orientation desired of the molecules. This stretching could be in a ratio of 3:1, 4:1, or 5:1 depending upon the degree of polarization desired of the ultimate film. The full stretch is obtained by moving the sections 15 and 16 outwardly until they assume a related position lying in a single plane.

Figure 3:
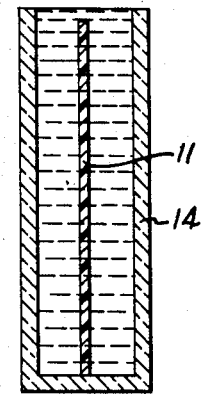
FIG. 3 is a sectional view of apparatus employed in carrying out the invention and illustrating one step of the method of said invention.
Figure 8:
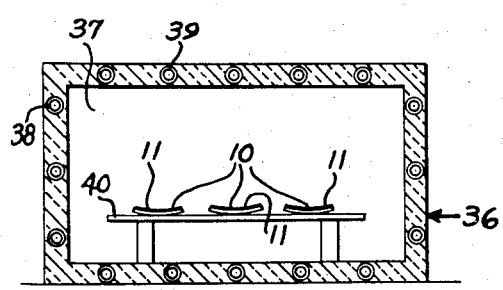
FIG. 8 is a diagrammatic sectional view of further apparatus and illustrating a further step of the method of the invention.
Figure 7:
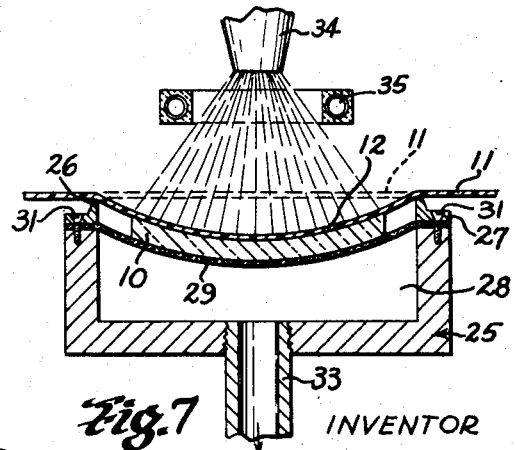
FIG. 7 is a view shown partially in section of further apparatus of the invention and illustrating another step in the method of said invention.

The sodium sulphate or other salt solution is then removed by rinsing the film in water and the stretched film, while retained in said stretched relation, is immersed in a solution containing 12 percent silicic acid, 75 percent water and 13 percent alcohol, in a container simulating the container 14, shown in FIG. 3. The stretched film is allowed to remain in said solution from approximately 5 to 10 seconds to imbibe a desired amount of silicic acid in said film. Upon removal of the film together with the stretching frame from the solution, the excess solution is removed by a suitable squeegee or the like. The stretched film 11, as shown diagrammatically in FIG. 7, is then placed on the top of a holder 25 having an upwardly extending relatively sharp annular portion 26 carried by a clamp ring 27 and with which the film 11 is initially engaged. The holder 25 has a hollow cavity 28 internally of which is supported a web of foraminous material 29 which functions as a sling-type support for the lens or similar article 10 which is to be provided with the light-polarizing film 11. The foraminous web 29 is secured to the holder by screws 31 which extend through said clamp ring 27 through the foraminous material, and into suitably threaded openings formed in the side walls of the holder 25. The cavity 28 of the holder 25 is provided in a side thereof with an opening in which is threaded a suitable pipeline 33. The pipeline 33 is connected with suitable means, not shown, for creating a vacuum in said cavity thereby causing the film 11, as shown by the dash lines in FIG. 7, to assume the shape of the surface 12 of the lens or other article supported by the foraminous material 29. In other words, at the start of the creating of the vacuum in the cavity 28, the film 11 will be drawn into intimate contact with the upwardly extending annular portion 26 of the clamp ring 27 thereby forming an intimate seal therewith whereupon the film will thereafter be drawn downwardly by the vacuum into intimate engaging relation with the surface 12 of the lens or other article 10 to which the film 11 is to be secured. The device of FIG. 7 further embodies a nozzle 34 connected to a suitable blower, not shown, and through which air is forced outwardly through a heating coil or the like 35 so that hot, dry air of approximately 150° F. or other suitable temperature, will be directed onto the film 11 during the vacuum-shaping thereof to the surface shape 12 of the lens or similar article 10. The shaped film is subjected to this hot air of approximately 150° F. for a period of approximately three minutes while under the pull of the vacuum or for a time interval sufficient to bring about the desired drying effect to cause it to retain its intimate relation with the surface 12. The assembly which comprises the lens or other article 10 having the intimately engaged film 11 thereon is then removed from the stretching frame and the assembly is placed in a suitable heating oven 36, diagrammatically illustrated in FIG. 8, whereby the assembly is subjected to a baking operation for a period of approximately two hours at a temperature of approximately 175° F. This temperature and time interval may be varied but is controlled so as to be below a temperature which will cause the iodine or other dye or stain to vaporize out of the sheet and is such that the said baking will insure a tenacious bond of the film 11 to the lens 10 or similar article and further functions to stabilize the sheet and render the same more resistant to scratching. The oven 36 may be of any known conventional type which, for example, might embody a hollow housing 37 having suitable electrical heating coils 38 and 39 in the side and upper walls thereof. Any suitable supporting table or the like 40 may be provided internally of the oven.

The silicic acid solution, although otherwise obtainable as is commonly known in the art, is conveniently obtainable by combining 100 grams of tetraethylorthosilicate with 40 grams of ethyl alcohol and 44 grams of 0.1 normal hydrochloric acid. The resultant and essential feature of the silicic acid solution is such that it may be diluted with water so that the silicic acid may be imbibed in polyvinyl alcohol film or it may be diluted with alcohol so that the silicic acid may be imbibed into a polyvinyl butyral film with the result that either type film will readily and tenaciously bond with the glass. This distinguishes from tetraethylorthosilicate in its original state in that tetraethylorthosilicate is not water-soluble and could not, as such, be imbibed in polyvinyl alcohol and would not in any case bond such films to glass.

While it has been stated that the silicic acid solution is formed with ethyl alcohol, it is to be understood that methyl alcohol or the like may be used in the same related proportion.

It is further to be understood that instead of using 0.1 normal hydrochloric acid, sulphuric acid, phosphoric acid or any other suitable acid may be used in approximately the same proportion as given.

It is further pointed out that instead of the dye which is referred to above as comprising potassium iodide and iodine in water, other dyes might be used. For example, bromine or direct cotton dyes, for example such cotton dyes as National Erir Black GX00 (color Index No. 581), Amanil Black (C.I.395), Amanil Fast Black (C.I.545), Tintex Black, and Tintex Purple, or a mordant dye such as logwood may be used. Also a vapor of hydrochloric acid may be used. It is to be understood that many other cotton dyes or the like may be employed in different related proportions depending upon the extent of dyeing desired, all of which is known in the art.

It is further pointed out that while a 10% sodium sulphate solution is referred to as the softening solution, other softening solutions such as sodium chloride, calcium chloride or sodium nitrate or the like in water can be used and may be varied from 5% to 20% if desired depending upon the dye or stain used to render the film light polarizing. In instances where iodine stain is used, the solution allows the softening of the film and at the same time prevents leaching out the absorbed iodine. Minimum concentrations are used to keep the material of the film from softening too fast and a 10% solution has been found to produce very desirable results.

It is also to be understood that the temperatures and time intervals referred to above for warming the air which is directed onto the sheet to a temperature of approximately 150° F. for a period of about three minutes, may be varied; for example, lower or higher temperatures may be used with longer or shorter time periods being required depending upon the particular temperature being employed. The upper limit, being dependent upon the stain or dye used, should be such as to not affect said stain or dye.

The preferred silicic acid solution comprises 12% silicic acid, 75% water, and 13% alcohol. However, it is to be understood that the silicic acid content can be varied over wide proportions of from approximately 6% to 40% keeping in mind that the actual amount of silicic acid present in the solution must be such as to insure the proper tenacious bond of the polarizing film 11 with the glass. The length of time as well as the concentration of silicic acid determines the amount imbibed in the surfaces of the film where it becomes available for bonding the film with the glass. With lesser amounts, greater time of imbibing is required and vice versa.

It is further to be understood that while various means and apparatus have been shown and described by way of illustration, other means and apparatus may be employed for accomplishing the various steps of the method, for example air pressure instead of vacuum may be used to force the film 11 into intimate engagement with the article 10. It is to be understood, therefore, that the disclosure in this respect is not to be interpreted in a limiting sense.

It is further pointed out that instead of subjecting the initial unstretched film to a dyeing solution, as described above, the film may be treated, stretched, imbibed in the silcic acid solution and secured to the lens or other similar article and may thereafter be subjected to the dyeing solution whereby the film will be rendered light polarizing. It is further point out that the method is such that at any stage thereof the dyeing of the film might be accomplished.

It is pointed out that, in addition to the films set forth above, any of the polymer films that contain free hydroxyl groups such as a surface hydrolyzed cellulose acetate, nitrate, butyrate or the like, which when treated with the silicic acid solution as set forth above, may be used and will tenaciously bond with the glass. It has been found that the more hydrolyzed the surface of the glass is a more tenacious bond of the film with the glass results.

While it has been taught in the art that silicic acid, either alone or cross-linked with polyvinyl alcohol, has been used as a scratch-resistant coating for methyl methacrylate and it has also been disclosed that tetraethylorthosilicate has been used or cross-linked with polyvinyl butyral to make a stabilized polarizer, it is pointed out that tetraethylorthosilicate is not a water-soluble material and cannot be used as such with polyvinyl alcohol which is water-soluble. The present invention, therefore, relates to the use of a silicic acid solution which is water-soluble, which will cross-link with the polyvinyl alcohol and other disclosed materials that contain free hydroxyl groups and will thereby tenaciously bond said materials with glass. In addition to the above, the silicic acid will act as a stabilizer for such materials and will render them more resistant to scratching.

By reference to glass as herein referred to, it is meant that any of the commonly known silicate and phosphate glasses may be used and the films as defined above may be tenaciously bonded therewith.

From the foregoing description, it will be seen that simple, efficient, and economical means and method have been provided for accomplishing all of the objects and advantages of the invention.

Having described my invention, I claim:

1. A light-polarizing laminated lens unit comprising a glass lens and a polyvinyl alcohol film, said film being molecularly oriented and containing a dye for producing a dichroic light-polarizing effect in said film, said film incorporating silicic acid therein and being tenaciously bonded to a side surface of said glass lens by subjecting the moistened film incorporating said silicic acid to heat while in contact with said glass lens for at least partially drying the film and by thereafter baking the assembled lens and film as a unit at a temperature not substantially exceeding 175° F., thereby to produce a tenacious bond between said lens and film by action of the silicic acid incorporated in said film.

2. A light-polarizing laminated lens unit comprising a glass lens and a polyvinyl butyral film, said film being molecularly oriented and containing a dye for producing a dichroic light-polarizing effect in said film, said film incorporating silicic acid therein and being tenaciously bonded to a side surface of said glass lens by subjecting the moistened film incorporating said silicic acid to heat while in contact with said glass lens for at least partially drying the film and by thereafter baking the assembled lens and film as a unit at a temperature not substantially exceeding 175° F., thereby to produce a tenacious bond between said lens and film by action of the silicic acid incorporated in said film.

3. A light-polarizing laminated lens unit comprising a glass lens and a film selected from the group consisting of polyvinyl alcohol and polyvinyl butyral films, said selected film being molecularly oriented and containing a dye for producing a dichroic light-polarizing effect in said film, said film incorporating silicic acid therein and being tenaciously bonded to a side surface of said glass lens by subjecting the moistened film incorporating said silicic acid to heat while in contact with said glass lens for at least partially drying the film and by thereafter baking the assembled lens and film as a unit at a temperature not substantially exceeding 175° F., thereby to produce a tenacious bond between said lens and film by action of the silicic acid incorporated in said film.

References Cited in the file of this patent

UNITED STATES PATENTS

| | | |
|---|---|---|
| 2,408,655 | Iler | Oct. 1, 1946 |
| 2,432,113 | Marks et al. | Dec. 9, 1947 |
| 2,487,063 | Marks | Nov. 8, 1949 |
| 2,524,960 | Cottet et al. | Oct. 10, 1950 |
| 2,577,620 | Mahler | Dec. 4, 1951 |
| 2,700,919 | Boone | Feb. 1, 1955 |
| 2,754,237 | Brooks | July 10, 1956 |
| 2,891,885 | Brooks | June 23, 1959 |